US012447395B2

(12) United States Patent
Alteon

(10) Patent No.: US 12,447,395 B2
(45) Date of Patent: Oct. 21, 2025

(54) HIGH-END RAFFLE SYSTEM

(71) Applicant: Renande Alteon, Dorchester Center, MA (US)

(72) Inventor: Renande Alteon, Dorchester Center, MA (US)

( * ) Notice: Subject to any disclaimer, the term of this patent is extended or adjusted under 35 U.S.C. 154(b) by 257 days.

(21) Appl. No.: 17/745,467

(22) Filed: May 16, 2022

(65) Prior Publication Data

US 2023/0364498 A1 Nov. 16, 2023

(51) Int. Cl.
*A63F 3/08* (2006.01)
*G07F 17/32* (2006.01)

(52) U.S. Cl.
CPC .......... *A63F 3/081* (2013.01); *G07F 17/3211* (2013.01); *G07F 17/323* (2013.01); *G07F 17/329* (2013.01); *A63F 2003/088* (2013.01)

(58) Field of Classification Search
CPC ............... A63F 3/081; A63F 2003/088; G07F 17/3211; G07F 17/323; G07F 17/329
See application file for complete search history.

(56) References Cited

U.S. PATENT DOCUMENTS 6,241,606 B1 * 6/2001 Riendeau ............ G07C 15/005 273/138.2
6,783,456 B2 8/2004 White
8,038,519 B1 10/2011 Luciano
8,262,453 B2 9/2012 Jubinville
8,398,484 B2 3/2013 Wright
9,248,369 B2 2/2016 Fotevski
9,652,938 B2 5/2017 Alvi
10,384,118 B1 * 8/2019 Osterman ............ G07F 17/329
2001/0026609 A1 10/2001 Weinstein
2002/0152130 A1 * 10/2002 Salls ...................... G06Q 30/02 705/27.1
2005/0137006 A1 * 6/2005 Rothschild ............. G07F 17/32 463/20
2007/0060305 A1 * 3/2007 Amaitis .............. G07F 17/3239 463/25
2007/0179839 A1 8/2007 Neemann
2007/0238501 A1 10/2007 Blass
2009/0318231 A1 * 12/2009 Lange ................. G07F 17/3223 463/42
2010/0093419 A1 4/2010 Wright
2017/0099334 A1 * 4/2017 Zalcman ............... G06Q 50/34
2020/0151429 A1 * 5/2020 Xu ......................... G06F 21/32

FOREIGN PATENT DOCUMENTS

WO 2004107237 A1 12/2004
WO 2016099339 A1 6/2016

* cited by examiner

*Primary Examiner* — Kevin Y Kim
(74) *Attorney, Agent, or Firm* — Lambert Shortell & Connaughton; David J. Connaughton, Jr.; Justin P. Tinger

(57) ABSTRACT

A computerized raffle system is disclosed herein. The computerized raffle system is referred to as a high-end system because of its utilization of various unique methods and features to improve or maintain end-user engagement. These features include, but are not limited to, the utilization of live streamed raffle drawings, raffle scratch tickets, and celebrity meet-and-greets as one potential prize.

13 Claims, 3 Drawing Sheets

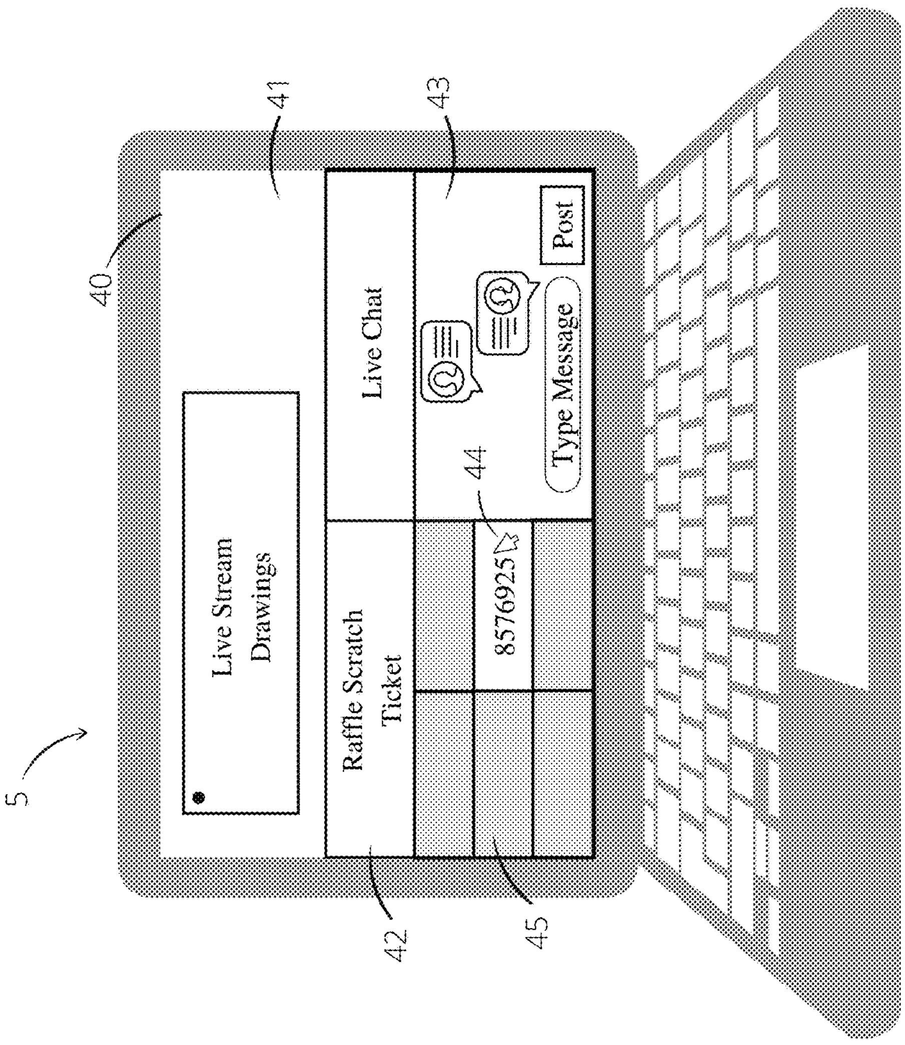
Fig. 3B
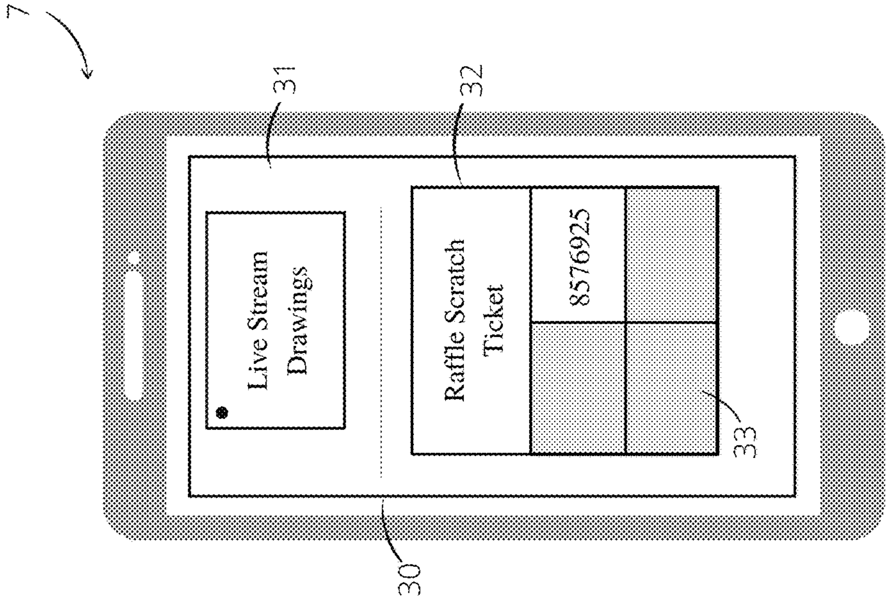
Fig. 3A
Fig. 3

HIGH-END RAFFLE SYSTEM

BACKGROUND

Technical Field

The present disclosure relates generally to a high-end raffle system. More particularly the present disclosure relates to a computerized system utilizing photograph-based identity verification for access to live streamed raffle drawings, which may be rewarded with tangible prizes or experiences.

Description of Related Art

A raffle is a form of gambling where participants in the raffle typically obtain a plurality of numbered tickets. Each numbered ticket typically has a counterpart numbered ticket that is placed in a bucket, a wheel, or some other device capable of randomizing the counterpart numbered tickets through shaking, spinning, or some other method. After randomization of the counterpart numbered tickets, hosts of the raffle grab at least one ticket from the randomizing device, and the participant holding the numbered ticket corresponding to the number on the counterpart ticket is declared the winner. The winner is given at least one prize from a collection of predetermined prizes, usually selected by the host of the raffle.

Raffle events are often used to raise funds for a specific charity or cause; however, raffles are not yet widely available for mass consumption for participants who enjoy the gambling aspect of raffles apart from the donation aspect. Previous methods for implementing raffles into computerized systems suffer from a number of problems, including, but not limited to, failure to provide participants with the same thrills experienced at live in-person raffle events and failure to provide a central identity verification system.

Therefore, what is needed is a high-end raffle system having the following characteristics and benefits over the prior art.

SUMMARY

The subject matter of this application may involve, in some cases, interrelated products, alternative solutions to a particular problem, and/or a plurality of different uses of a single system or article.

In one aspect, a computerized raffle system is disclosed. In this aspect, the computerized raffle system comprises a central server, a participant computer, a host computer, and a website. The central server is connected to a network (e.g., the internet), and both the host computer and the participant computer have graphical user interfaces. The website is displayed on the graphical user interface of the participant computer, and the host computer is operable to perform the step of communicating information for a plurality of virtual raffle tickets to the central server. The central server is operable to perform the step of saving information for the plurality of virtual raffle tickets in a database, and the participant computer is operable to perform the step of purchasing one ticket from the plurality of virtual raffle tickets by accessing information for the one ticket in the database.

In another aspect, a computerized raffle system is disclosed. In this aspect, the computerized raffle system comprises a central server, a participant mobile device, a host computer, and an application. The central server is connected to a network (e.g., the internet), and both the host computer and the participant mobile device have graphical user interfaces. The application is displayed on the graphical user interface of the participant mobile device, and the host computer is operable to perform the step of communicating information for a plurality of virtual raffle tickets to the central server. The central server is operable to perform the step of saving information for the plurality of virtual raffle tickets in a database, and the participant mobile device is operable to perform the step of purchasing one ticket from the plurality of virtual raffle tickets by accessing information for the one ticket in the database.

It should be expressly understood that the various physical elements of the present disclosure summarized and further disclosed herein may be of varying sizes, shapes, or otherwise dimensions and made from a variety of different materials or methods of manufacture without straying from the scope of the present disclosure.

BRIEF DESCRIPTION OF THE DRAWINGS

FIG. 3 is a perspective view of two exemplary embodiments of user interfaces of the system disclosed herein.

FIG. 3A is a perspective view of an embodiment of a user interface for a participant mobile device.

FIG. 3B is a perspective view of an embodiment of a user interface for a participant computer.

DETAILED DESCRIPTION

The detailed description set forth below, in connection with the appended drawings, is intended as a description of presently preferred embodiments of the computerized raffle system disclosed herein. However, the preferred embodiments described herein do not represent the only forms in which the present disclosure may be constructed and/or utilized. In other words, this description merely sets forth the functions and the sequence of steps for constructing and operating the computerized raffle system in connection with the illustrated embodiments in FIGS. 1 through 3.

Figure 1:
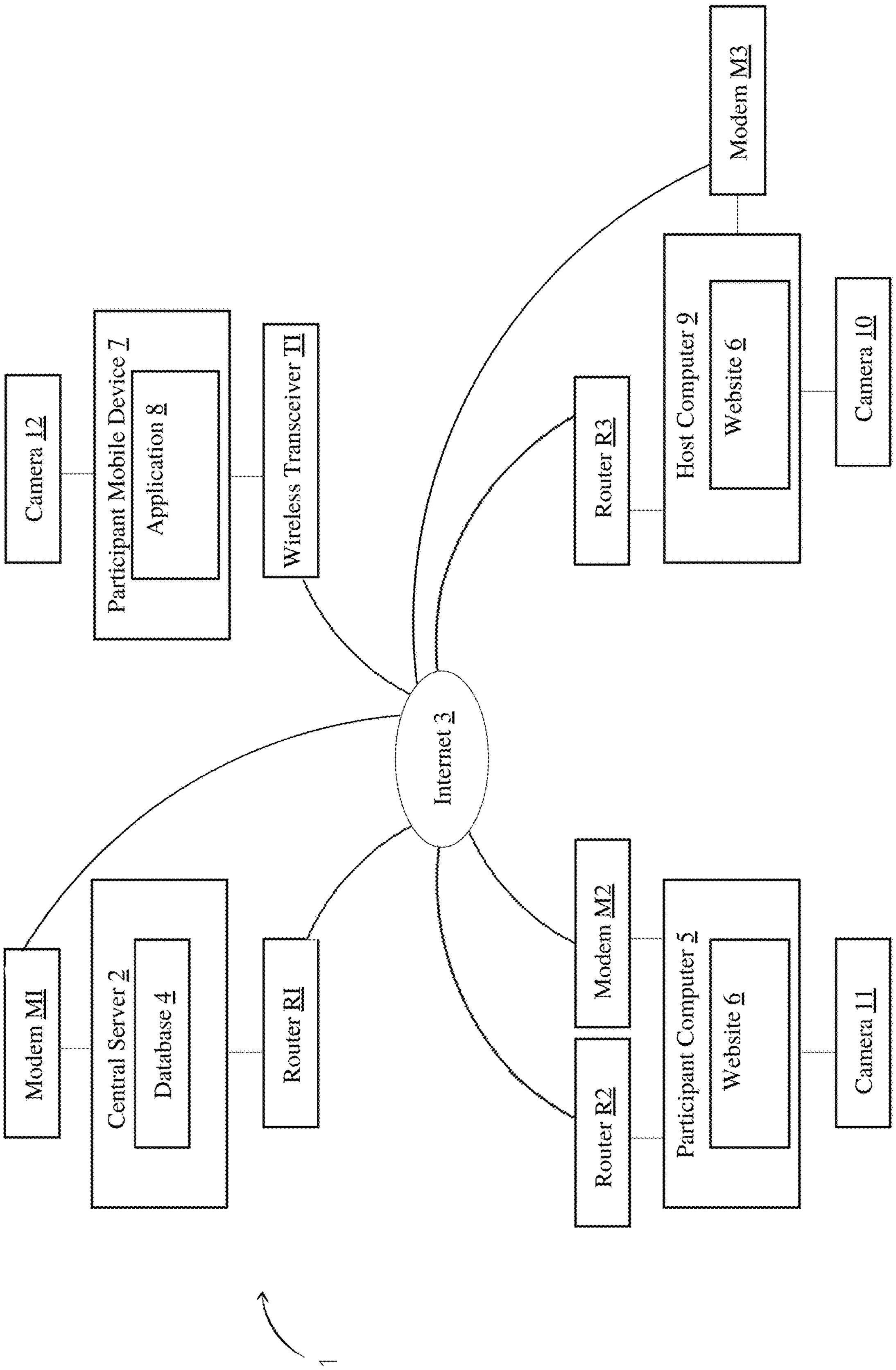
FIG. 1 is a system diagram of an exemplary embodiment of the present disclosure.

Turning now to FIG. 1, which provides an illustration of one embodiment of the computerized system 1 disclosed herein. In this embodiment, the computerized system 1 includes a central server 2 in networked communication with the internet 3. The central server 2 stores information in at least one database 4, and the central server 2 containing the database 4 are networked to the internet 3 through connection with a router R1 and a modem M1. Similarly, a first participant computer 5 is networked to the internet 3 by a router R2 and modem M2. A website 6 comprising information received from the central server 2 over the internet 3 is displayed on a graphical user interface of the participant computer 5. Also, in this embodiment, a second participant mobile device 7 is networked to the internet 3 by a wireless transceiver T1. An application 8 comprising information received from the central server 2 over the internet 3 is also displayed on a graphical user interface of the participant mobile device 7. The embodiment of the system 1 illustrated in FIG. 1 may be used to carry out a variety of method steps associated with the operation of the system 1 or its various modules and components.

Figure 2:
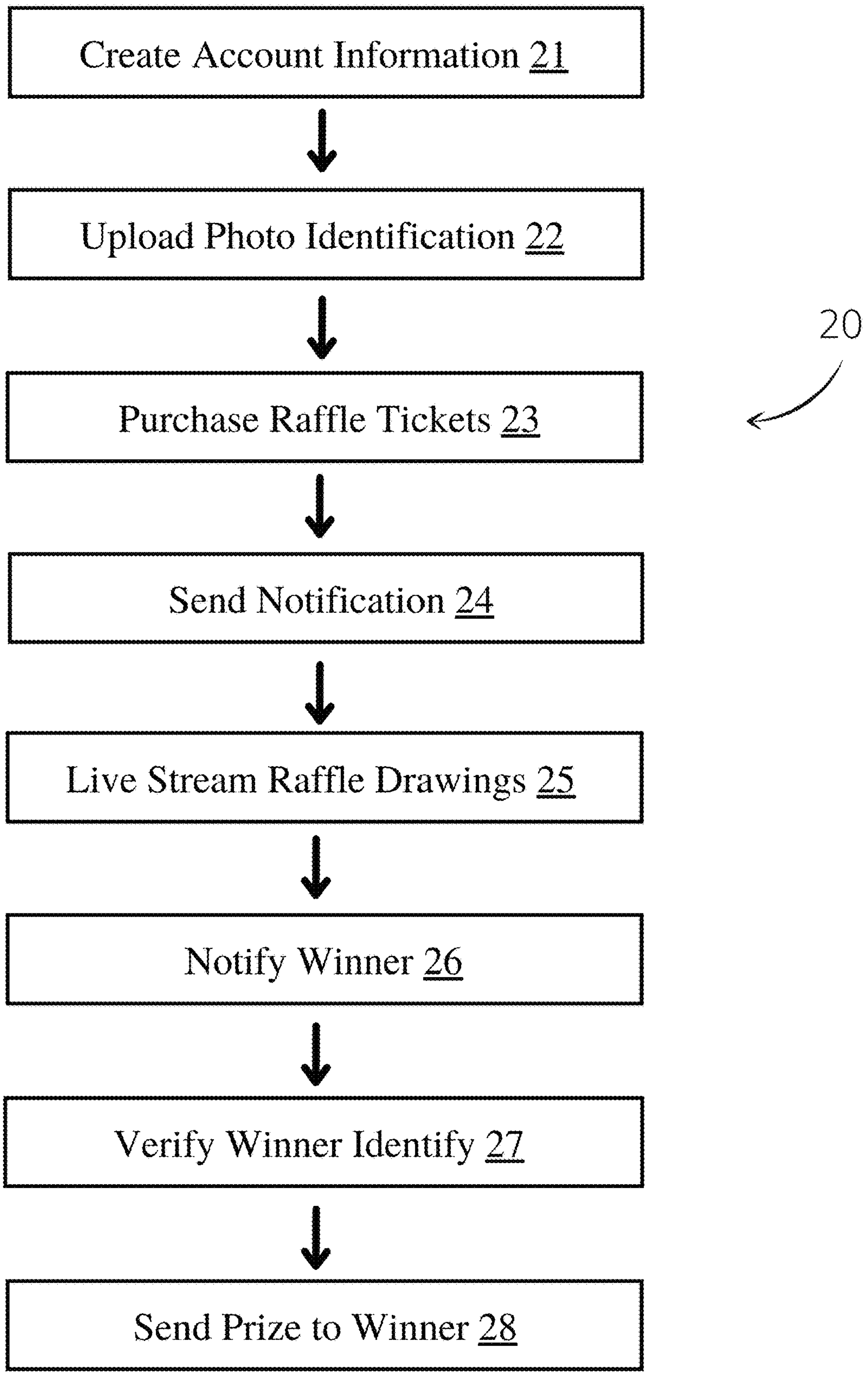
FIG. 2 is a flowchart of an exemplary embodiment for a method of performing steps required by the system disclosed herein.

FIG. 2 provides an illustration of a flowchart of one embodiment of a computerized method 20 that may be carried out by the system 1 and its various modules and components. For example, in this embodiment, a participant my log into the system 1 on a website 6 or an application 8, which may be displayed on the graphical user interface of a participant computer 5 or a participant mobile device 7, interchangeably. If the participant is a first-time user, the participant may perform the step of creating account information 21, such as a username and password that may be entered in a username field and a password field, respectively. The username and password fields may be provided on the graphical user interface for either the website 6 or the application 8. The participant computer 5 or the participant mobile device 7 may then perform the step of transmitting the participant's account information to the central server 2, which may then perform the step of saving the participant's account information in the database 4.

After creating their account information, a participant may then perform the step of uploading a photograph of themselves for identity verification 22. A participant may upload the photo through a website 6 or application 8 on their computer 5 or mobile device 7. The computer 5 or mobile device 7 may then perform the step of sending the participant's photo to the central server 2, which may then perform the step of saving the participant's account information in the database 4. Once the participant's photo is saved in the system 1 for later verification, the participant may then perform the step of purchasing a raffle ticket 23.

In a preferred embodiment, a raffle ticket or a plurality of raffle tickets that are purchased by a participant may be virtual raffle tickets. These virtual raffle tickets may be made available to participants via their computer 5 or mobile device 7 from the central server 2. Information for virtual raffle tickets may be present on the central server 2 due to a host computer 9 communicating the information for the tickets to the server 2 through a network connection. In the preferred embodiment, the host computer 9 may be networked to the internet 3 through a router R3 and modem M3. A website 6 displayed on a graphical user interface for the host computer 9 may provide fields for hosts to input data and information concerning an upcoming raffle event, the purchase price and amount of any virtual raffle tickets, the time of any raffle drawings, and other relevant information. In a preferred embodiment, hosts may be third parties that are not administrators of the system 1.

Depending on the embodiment, contact information for participants may be saved on the database 4 on the central server 2 when participants' accounts are created 21 or when participants' raffle tickets are purchased 23. In either case, the server 2 may send notifications 24 to participants' computers 5 or mobile devices 7 relating to ticket purchase confirmation, the results of any raffle drawings, the timing of any live raffle drawings, or other relevant information. In at least one embodiment, a raffle winner may be selected by a randomization process carried out on the central server 2. For example, a random number generator software on the central server 2 may select a winning ticket number from a plurality of tickets stored on the server 2. However, depending on the host of a raffle event, the selection or drawing of winning virtual tickets may be live streamed 25 to participants on their computers 5 or mobile devices 7.

In a preferred embodiment, raffle drawings are live streamed 25 from a host computer 9, which sends video data received from a camera 10 connected to the host computer 9 to either the application 8 or the website 6 displayed on the graphical user interface of a participant's computer 5 or mobile device 7. The live streaming of raffle drawings 25 solves a problem with computerized raffle systems. As previously mentioned, in-person live raffle drawings are thrilling to participants who enjoy the gambling the aspect of raffles. Other computerized raffle systems fail to maintain participant engagement when virtual drawings are done at random times or in a way that cannot be visually watched by participants. A high-end raffle system that incorporates live streamed raffle drawings solves the problem of minimal or diminished participant engagement and enjoyment.

When a winning ticket or number is selected, the host computer 9 sends the results to the central server 2, and a database engine compares the winning ticket or number with purchased virtual tickets or numbers stored in a database 4. When the winning ticket or number matches a purchased virtual ticket or number, the holder of the purchased ticket or number is notified 26. If the raffle drawing was live streamed, the winner may be notified 26 on the live stream. The winner may also be notified 26 by receiving a winning notification, such as an email or text containing information about a prize or prizes, on their computer 5 or mobile device 7. After notifying the winner 26, in at least one embodiment, before the winner receives the prize or prizes, the winner's identity is verified 27 through a comparison of the winner's photo identification stored in the central server 2 with either a driver's license photograph, a passport photograph, or other forms of photo identification verification. In one embodiment, this comparison is performed by a facial recognition software on the central server 2.

The photograph-based identity verification method described herein solves another problem with computerized raffle systems. The problem of identity verification is inherent to computerized systems. At least at a live in-person raffle, the identity of the winner can be verified by visually observing them. However, in many computerized raffle systems, the only information available to a host is the account information associated with a participant. The account information may include a username and a previously uploaded photograph of the participant. However, mere uploading of a photograph does not verify the identity of the participant because, in theory, a participant could upload a photograph of someone else. Therefore, in at least one embodiment disclosed herein, a secondary form of identity verification may need to be uploaded by a participant in order to prove the participant is indeed the person represented in the first uploaded photo stored on the central server.

The centralized nature of the identity verification method disclosed herein solves another problem with computerized raffle systems. Some previously known computerized raffle systems utilize a third party service for identity verification. However, this creates an additional risk to participants of their personal identification information being misappropriated or stolen in a data breach. The system disclosed herein utilizes a secure central server for the storage of identification information, which reduces the risk of such information being stolen in a data breach.

In one embodiment, the winner's identity is verified 27 through comparison of the winner's previously uploaded photo identification with a live video of the winner. In such an embodiment, the live video of the winner may be streamed to the host computer 9 from a camera 11 connected to the winner's computer 5 or a camera 12 connected to the winner's mobile device 7. Before or during the live stream of the winner from the winner's computer 5 or mobile device 7, the central server 2 may send the winner's stored photo identification to the host computer 9 for visual comparison by the host. Regardless of what identity verification method is used, after verification of a winner's identity 27, the central server 2 may coordinate the sending of a prize to the winner 28.

Prizes may be tangible items or experiences. Tangible prizes may include, but are not limited to, money, gift cards, a car, electronic items, or other similar types of items. Experience prizes may include, but are not limited to, participating in an outing or activity, such as a golf outing, dinner at an expensive restaurant, or meeting with a celebrity, in-person or online. As used herein, the term "celebrity" shall mean a person who has (1) achieved at least one million followers or subscribers on a social media platform, and/or (2) has had their identity verified on a social media platform (e.g., someone is a "celebrity" if they have a blue check-mark on Twitter®). These various types of prizes also help solve the aforementioned problem of minimal or diminished engagement for computerized raffle systems.

Another problem solved by the present disclosure is the inherent lack of screen space on computerized systems. Turning now to FIG. 3, which shows an embodiment of a participant mobile device 7 (FIG. 3A) and a participant computer 5 (FIG. 3B). In this embodiment, the participant mobile device 7 is a cell phone. However, the term "mobile device" may also mean a tablet, a laptop, or the like, depending on the embodiment. The problem with computerized devices, such as mobile devices 7 and computers 5, is limited screen space on the graphical user interfaces 30, 40. The present disclosure solves this problem by compartmentalizing or sectioning off different features of the application 8 or website 6, which allows various features to be presented on the same user interface 30, 40. For example, in FIG. 3A, raffle live stream drawings are displayed on a top portion 31 of the user interface 30, and a raffle scratch ticket is displayed on a bottom portion 32 of the user interface 30. As another example, in FIG. 3B, raffle live stream drawings are displayed on a top portion 41 of the user interface 40, and a raffle scratch ticket and a live chat feature are displayed on a bottom left portion 42 and a bottom right portion 43 of the user interface 40, respectively.

As used herein the term "raffle scratch ticket" shall mean a scratch-off ticket that reveals raffle ticket numbers when it's scratch-off boxes are removed. The difference between a raffle scratch ticket and a standard scratch-off ticket is that a standard scratch-off ticket reveals monetary prizes when its scratch-off boxes are removed; whereas, a "raffle scratch ticket" reveals raffle ticket numbers that may or may not be selected in a raffle drawing. As shown in FIG. 3A, when either a standard scratch-off ticket or a raffle scratch ticket is displayed on the user interface for a participant mobile device 7, the scratch-off boxes 33 may be removed by the thumb or finger of a participant, provided the mobile device 7 has touch-screen capabilities. On the other hand, as shown in FIG. 3B, when either a standard scratch-off ticket or a raffle scratch ticket is displayed on the user interface for a participant computer 5, the scratch-off boxes 45 may be removed by the click and movement of a mouse arrow 44. The use of scratch-off tickets also helps alleviate the problem of minimal or diminished user engagement with computerized raffle systems because scratch-off tickets are heavily associated with gambling, such that participants' brains may release high levels of dopamine upon use of these types of tickets.

While several variations of the present disclosure have been illustrated by way of example in preferred or particular embodiments, it is apparent that further embodiments could be developed within the spirit and scope of the present disclosure, or the inventive concept thereof. However, it is to be expressly understood that elements described in one embodiment may be incorporated with any other embodiment in combination with any other elements disclosed herein in the various embodiments. It is also to be expressly understood that any modifications and adaptations to the present disclosure are within the spirit and scope of the present disclosure, and are inclusive, but not limited to the following appended claims as set forth.

What is claimed is:

1. A computerized raffle system comprising:

a central server, wherein the central server is connected to a network;

a participant computing device connected to the network, the participant computing device comprising a graphical user interface;

a host computer connected to the network, the host computer comprising a graphical user interface;

wherein the graphical user interface of the host computer displays a website, wherein the host computer provides fields for a host to input data and information regarding an upcoming raffle event, at least including a purchase price and number of virtual raffle tickets and a time;

a website, wherein the website is displayed on the graphical user interface of the participant computer;

wherein the host computer is operable to perform the step of communicating information for a plurality of virtual raffle tickets to the central server;

wherein the central server is operable to perform the step of saving information for the plurality of virtual raffle tickets to a database;

wherein the central server is operable to verify a winner's identity using facial recognition;

wherein the participant computing device is operable to perform the step of purchasing one ticket from the plurality of virtual raffle tickets by accessing information for the one ticket in the database;

wherein, a plurality of features is simultaneously presented on the graphical user interface by compartmentalization;

wherein, an implementation of the compartmentalization fits a shape, size, and type of the participant computing device;

wherein, the plurality of features includes at least a live stream of raffle drawings, a raffle ticket scratch;

wherein, in response to that the participant computing device being a mobile phone, the live stream is displayed on a top part of a screen of the mobile phone, and the raffle scratch ticket is displayed on a bottom part of the screen of the mobile phone;

wherein, in response to that the participant computing device being a personal computer, the live stream is displayed on a top part of a screen of the personal computer, the raffle scratch ticket is displayed on a bottom-left part of the screen of the personal computer, and a live chat is displayed on a bottom-right part of the screen of the personal computer;

wherein, the raffle scratch ticket includes a plurality of sections, each of the plurality of sections including an opaque cover and a raffle ticket number under the opaque cover;

wherein, in response to that the participant computing device having a touchscreen, the raffle ticket number is revealed by removing the opaque cover by movement of a thumb or finger on the touchscreen;

wherein, in response to that the participant computing device having or connected to a mouse, the raffle ticket number is revealed by removing the opaque cover by a click and movement of the mouse;

wherein, a selected raffle ticket number is announced in the live stream to indicate the winner's identity;

wherein the participant computing device is further operable to perform the step of uploading a photograph;

wherein the central server is further operable to perform the step of saving the photograph in the database; and wherein the central server is operable to verify the winner's identity using facial recognition by comparing the saved photograph in the database with a live video recorded from the participant computing device and streamed to the central server;

wherein, the verification of the winner's identity is conducted by the central server and not a third-party service;

wherein, the verification of the winner's identity requires an uploading of a secondary form of identity verification from the winner.

2. The computerized raffle system of claim 1 wherein the central server is further operable to perform the step of sending a ticket purchase confirmation to the participant computing device.

3. The computerized raffle system of claim 1 wherein the central server is further operable to perform the step of sending a raffle drawing notification to the participant computing device.

4. The computerized raffle system of claim 1 wherein the host computer is further operable to perform the step of live streaming a raffle drawing to the participant computing device.

5. The computerized raffle system of claim 4 wherein the central server is further operable to perform the step of selecting a winning ticket from the plurality of virtual raffle tickets and presenting an identifier corresponding to the winning ticket on the live stream.

6. The computerized raffle system of claim 5 wherein the winning ticket is the one ticket purchased by the participant computing device, and the central server is further operable to perform the step of sending a winning notification to the participant computing device.

7. The computerized raffle system of claim 6 wherein the winning notification comprises information about a prize.

8. The computerized raffle system of claim 7 wherein the prize is a meeting with a celebrity.

9. A computerized raffle system comprising:

a central server, wherein the central server is connected to a network;

a participant mobile device connected to the network, the participant mobile device comprising a graphical user interface;

a host computer connected to the network, the host computer comprising a graphical user interface;

wherein the graphical user interface of the host computer displays a website, wherein the host computer provides fields for a host to input data and information regarding an upcoming raffle event, at least including a purchase price and number of virtual raffle tickets, and a time;

an application, wherein the application is displayed on the graphical user interface of the participant mobile device;

wherein the host computer is operable to perform the step of communicating information for a plurality of virtual raffle tickets to the central server;

wherein the central server is operable to perform the step of saving information for the plurality of virtual raffle tickets to a database;

wherein the central server is operable to verify a winner's identity using facial recognition comparing an image recorded from the participant mobile device and an image saved to the host computer;

wherein the participant mobile device is operable to perform the step of purchasing one ticket from the plurality of virtual raffle tickets by accessing information for the one ticket in the database;

wherein, a plurality of features is simultaneously presented on the graphical user interface by compartmentalization;

wherein, an implementation of the compartmentalization fits a shape, size, and type of the participant mobile device;

wherein, the plurality of features includes at least a live stream of raffle drawings, a raffle ticket scratch;

wherein, in response to that the participant computing device being a mobile phone, the live stream is displayed on a top part of a screen of the mobile phone, and the raffle scratch ticket is displayed on a bottom part of the screen of the mobile phone;

wherein, in response to that the participant computing device being a personal computer, the live stream is displayed on a top part of a screen of the personal computer, the raffle scratch ticket is displayed on a bottom-left part of the screen of the personal computer, and a live chat is displayed on a bottom-right part of the screen of the personal computer;

wherein, the raffle scratch ticket includes a plurality of sections, each of the plurality of sections including an opaque cover and a raffle ticket number under the opaque cover;

wherein, in response to that the participant computing device having a touchscreen, the raffle ticket number is revealed by removing the opaque cover by movement of a thumb or finger on the touchscreen;

wherein, in response to that the participant computing device having or connected to a mouse, the raffle ticket number is revealed by removing the opaque cover by a click and movement of the mouse;

wherein, a selected raffle ticket number is announced in the live stream to indicate the winner's identity;

wherein the raffle scratch ticket is displayed on the graphical user interface as part of the plurality of features, and wherein the display of the raffle scratch ticket comprises displaying a plurality of scratch-off boxes, and the website is further operable to perform the step of removing one box from the plurality of scratch-off boxes by a user input gesture and wherein the step of removing the one box reveals a raffle identifier corresponding to the raffle scratch ticket to be drawn;

wherein, a verification of the winner's identity is conducted by the central server and not a third-party service;

wherein, the verification of the winner's identity requires an uploading of a secondary form of identity verification from the winner.

10. The computerized raffle system of claim 9 wherein the host computer is further operable to perform the step of live streaming a raffle drawing to the participant mobile device.

11. The computerized raffle system of claim 10 wherein the participant mobile device is further operable to perform the step of uploading a photograph.

12. The computerized raffle system of claim 11 wherein the central server is further operable to perform the step of saving the photograph in the database.

13. The computerized raffle system of claim 12 wherein the central server is further operable to perform the step of verifying a participant identity by comparing the photograph with one of a driver's license photograph or a passport photograph.

* * * * *